March 12, 1957 W. J. ZEHR 2,784,918

WEB WINDING MECHANISM

Filed March 2, 1953 8 Sheets-Sheet 1

Inventor
William J. Zehr
By-
Cromwell, Greist & Warden
Attys.

WEB WINDING MECHANISM

INVENTOR.
William J. Zehr
BY
Cromwell, Greist & Warden
Attys.

March 12, 1957 W. J. ZEHR 2,784,918

WEB WINDING MECHANISM

Filed March 2, 1953 8 Sheets-Sheet 3

INVENTOR.

William J. Zehr

BY

Cromwell, Greist & Warden

Attys.

March 12, 1957 W. J. ZEHR 2,784,918

WEB WINDING MECHANISM

Filed March 2, 1953 8 Sheets-Sheet 4

INVENTOR.

William J. Zehr.

BY

Cromwell, Greist & Warden

Attys.

March 12, 1957 W. J. ZEHR 2,784,918

WEB WINDING MECHANISM

Filed March 2, 1953 8 Sheets-Sheet 5

INVENTOR.
William J. Zehr
BY
Cromwell, Greist & Warden
Attys.

March 12, 1957 W. J. ZEHR 2,784,918

WEB WINDING MECHANISM

Filed March 2, 1953 8 Sheets-Sheet 6

INVENTOR.

William J. Zehr.

BY

Cromwell, Greist & Warden

Attys.

INVENTOR.
William J. Zehr
BY
Cromwell, Greist & Warden
Attys.

INVENTOR.
William J. Zehr
BY
Cromwell, Greist & Warden
Attys.

United States Patent Office 2,784,918
Patented Mar. 12, 1957

2,784,918

WEB WINDING MECHANISM

William J. Zehr, Mount Vernon, Ohio, assignor, by mesne assignments, to Continental Can Company, Inc., New York, N. Y., a corporation of New York Application March 2, 1953, Serial No. 339,803
9 Claims. (Cl. 242—56)

This invention relates to mechanisms for handling web sheet material and is more particularly concerned with improvements in a mechanism adapted for use with a printing press for continuously rewinding a web which is printed on the press and for slitting or dividing the web, if desired, into a plurality of smaller webs along lines of severance which are located in proper relation to the printed designs appearing on the web prior to rewinding the smaller webs on separate rolls.

It is a general object of the invention to provide a mechanism for attachment to a rotary printing press which will rewind the printed web as it is delivered from the printing mechanism onto a plurality of successive rolls with automatic mechanism for transversely severing the web when the desired amount is wound on a roll and for starting a new roll without stopping the travel of the web through the press.

It is a further object of the invention to provide a mechanism for incorporation in a rotary printing press in which successive rolls are positioned for rewinding the web thereon as it is delivered from the printing mechanism and the web is automatically severed between successive rolls as predetermined amounts of the web are wound on the rolls.

It is another object of the invention to provide a mechanism of the type described in which pairs of roll forming devices are mounted on rotatable frames which are power operated and which have mounted thereon web severing devices effective automatically upon rotation of the frames whereby to permit the web to be rewound on one of the roll forming devices of the respective pairs thereof and, when a predetermined amount is wound thereon, to be automatically severed and a new roll begun on the other roll forming device while the finished roll is removed from the frame.

It is a still further object of the invention to provide a web slitting and rewinding mechanism of the type described having a pair of roll supports for each strip portion of the slit web which roll supports are mounted so as to be interchangeably positioned and having means combined therewith to automatically sever each strip portion as a full roll is wound on a support and the support is interchanged with the companion support on which a new roll is begun by engagement of the leading end portion of the severed web with the latter support, the completed roll being adapted to be removed from the mechanism while the newly started roll is being wound on its support.

It is another object of the invention to provide a web slitting and winding mechanism in which a plurality of pairs of roll supports are mounted on parallel axes at opposite ends of frames, which frames are rotatably mounted on axes parallel with the axis of the roll supports, the respective pairs of roll supports being spaced at opposite ends of the frames, and in which means is provided to control the rotation of the roll supports for winding the slit portions of the web and to rotate the frame about its axis for interpositioning the respective roll supports of each pair whereby to permit the rolls to be removed from the mechanism upon the winding thereon of the desired length of the web and to enable the web to be wound continuously on the one or the other of each pair of the roll supports.

It is another object of the invention to provide a mechanism of the type described in which a slack take-up mechanism is provided with automatic control means to maintain the web under predetermined tension while it is advancing through the mechanism.

It is a further object of the invention to provide a mechanism of the type described in which the web is moved through a visual inspection area just prior to movement into the area of operation of the web slitting devices.

These and other objects of the invention will be understood from a consideration of the mechanism which is shown by way of illustration in the accompanying drawings, wherein.

Figure 1:
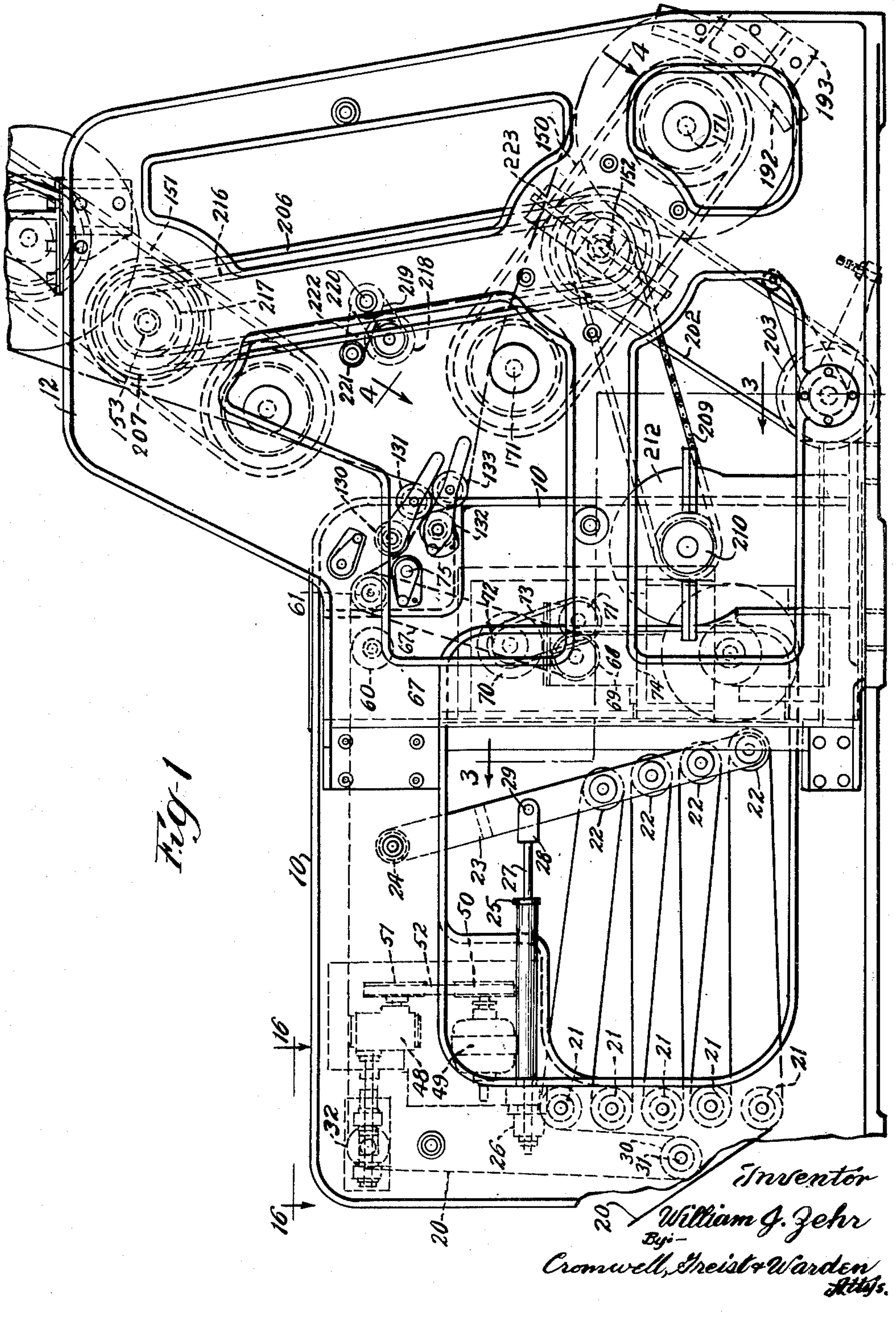
Fig. 1 is a side elevation of a mechanism incorporating the principal features of the invention, with portions shown schematically and other portions broken away.

Referring to the drawings, there is illustrated a mechanism which is adapted to be attached to or incorporated in the delivery end of a rotary printing press, but which may also be used independently of the press, provided, of course, that suitable arrangement is made for supporting at the receiving end thereof a roll of printed material which it is desired to slit and rewind on the mechanism.

The illustrated apparatus is supported on a frame structure (Figs. 1 and 2) which comprises a forward portion consisting of vertical side plates 10 and 11 which are suitably tied or connected together by cross connecting members (not shown) and a rearward portion consisting of upright frame side plates 12 and 13 which are also tied together or connected by suitable cross brace members (not shown). The two frame structures are joined together in alignment with the rearward side plates separated a somewhat greater distance than the forward side plates 10 and 11. The forward plates 10 and 11 support between them the web guiding, tensioning and slitting elements while the rewinding elements are supported between the rearward frame plates 12 and 13.

The web 20 (Fig. 1) is delivered to the mechanism from the rotary printing press over the lowermost one of a series of vertically spaced rollers 21 which are journaled between the frame side plates 10 and 11. The web 20 is threaded back and forward between the fixed rollers 21 and a cooperating series of movable rollers 22 which are mounted in opposed relation thereto on a pair of arms 23 which are connected by a suitable cross bar and pivoted at 24 to the frame plates 10 and 11 for swinging movement relative to the fixed rollers 21. A pair of air cylinders 25 are connected at their fixed end to a cross frame member 26 on the supporting frame and have their pistons 27 connected by yokes 28 and pivots 29 to intermediate portions of arms 23. The air cylinders 25 supply a constant, but manually adjustable, force to the dancing idler system. The arms 23 are connected to a reactor core (not shown) so that their position regulates the position of the reactor core which regulates the current delivered to the wind-up motor and so the tension in the web.

The web 20 passes from the topmost one of rollers 21 beneath an idler roller 30 which is journaled at 31 in the side frame plates 10 and 11. From the roller 30 the web 20 moves upward and around a guide roller 32.

Figure 16:
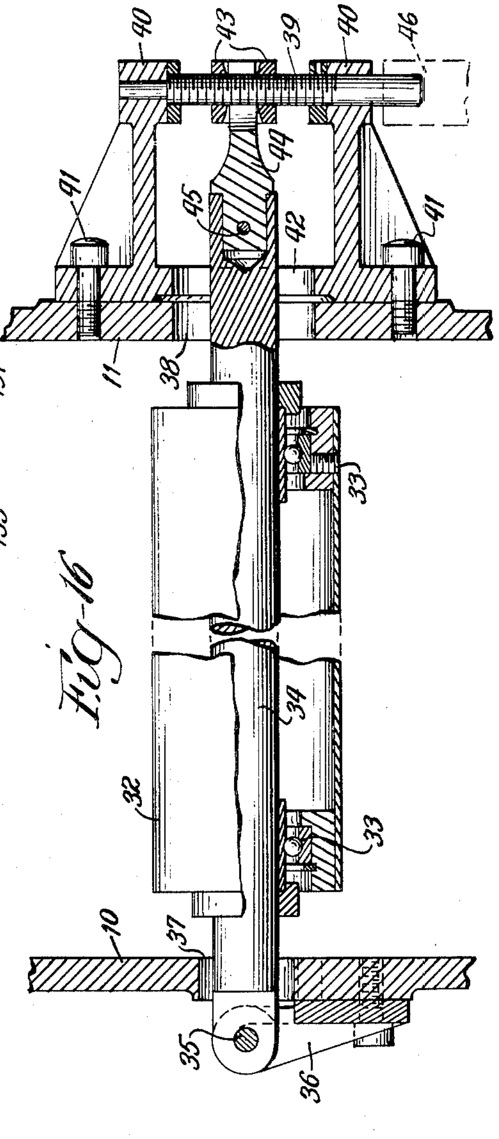
Fig. 16 is a section taken on the line 16—16 of Fig. 1, to an enlarged scale.

The guide roller 32 (Fig. 16) is mounted by means of bearings 33 for free rotation on a transverse support shaft 34. The shaft 34 is pivotally mounted at 35 on a bracket 36 secured to the side frame plate 10. The shaft 34 extends through an aperture 37 in the side frame plate 10 and also through an aperture 38 in the side frame plate 11 and projects beyond the outer face of the latter. Mechanism is provided for swinging the shaft 34 about its pivot 35 to properly guide the web 20 as it is advanced over the roll 32. This mechanism comprises a threaded shaft 39 journaled in a pair of arms 40 on a supporting bracket which is attached to the outer face of the side frame plate 11 by bolts 41 and the base of which is apertured at 42 for receiving the end of the shaft 34. The shaft 39 carries a slotted adjusting nut 43 which is arranged on opposite sides of a yoke member 44 connected to the end of the shaft 34 and extending axially therefrom, the yoke 44 being fastened to the shaft end by the pin 45. Rotation of the shaft 39 in either direction swings the end of the shaft 34 to change the position of the roll 32 relative to the pivot 35. The adjusting rod 39 is connected at its one end by connecting sleeve 46 (Fig. 2) with the power shaft 47 on a speed reducer 48. The speed reducer 48 is operated by a motor 49 (Fig. 1) which is connected in driving relation therewith by the pulleys 50 and 51 and the drive belt 52. The motor 49 is adapted to be controlled by an electric eye scanning device or a similar web gauging mechanism, of conventional construction which is not shown. The purpose of this mechanism is, of course, to adjust the travel of the web sidewise in relation to the printed designs on the web or to a side edge of the web in order to insure that it will be properly positioned for the slitting operation when it reaches the slitting knives.

The web 20 passes from the guide roll 32 across the top of the forward portion of the supporting frame, between the side frame plates 10 and 11, where it is visible for a length sufficient to permit inspection or observation by the operator of the machine. It is supported as it approaches the end of the forward section of the frame by an idler roller 60 (Fig. 1) which is journaled in suitable bearings in the side frame plates 10 and 11.

Immediately adjacent the idler roller 60 there is mounted a parallel gyrating roll 61 (Figs. 7 and 8) which is supported in freely revolving relation on a transverse shaft 62 by means of end bearings 63. The shaft 62 is secured in eccentric relation in sleeves 64 and 64' at the ends thereof which are in turn mounted in bearings 65 in the side frame plates 10 and 11. The shaft 62 and sleeve 64 extend beyond the frame plate 11 and a sprocket 66 is secured on the sleeve 64 so that rotation of the sprocket 66 causes eccentric rotation of the shaft 62 which remains parallel to the other idlers.

The sprocket 66 is connected by a drive chain 67 (Fig. 1) with a sprocket 68 on the output shaft of a speed reducer 69, and the input shaft of the latter is connected in driving relation with a motor 70 by means of the sprockets 71 and 72 and the connecting drive belt 73. The speed reducer 69 and the motor 70 are mounted on suitable supporting brackets, indicated at 74, on the outside of the frame plate 11.

The slow gyrating motion of the shaft 62 tends to make the web path traverse up and down as it passes over the roller 61 and approaches the slitting mechanism which will now be described. This prevents rapid wear of the slitting blades at only one point which would occur if the web path were fixed.

Figure 7:
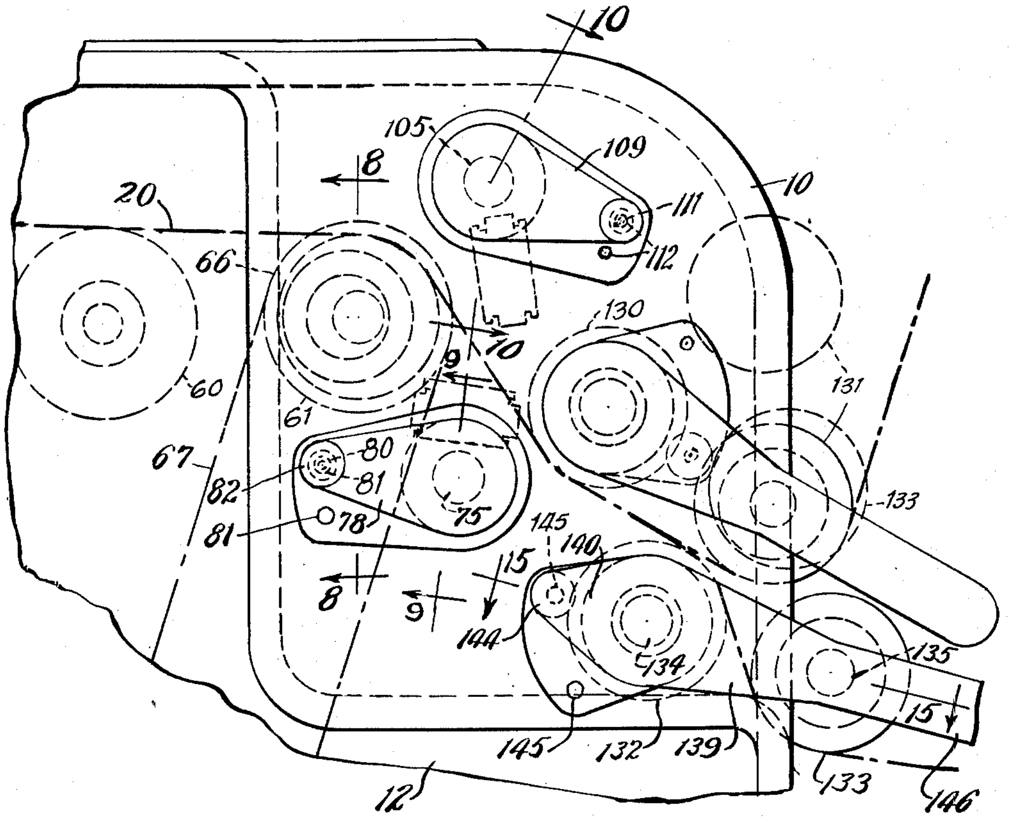
Fig. 7 is a fragmentary side elevation to an enlarged scale of the portion of the machine in which the longitudinal slitting mechanism is mounted.
Figure 8:
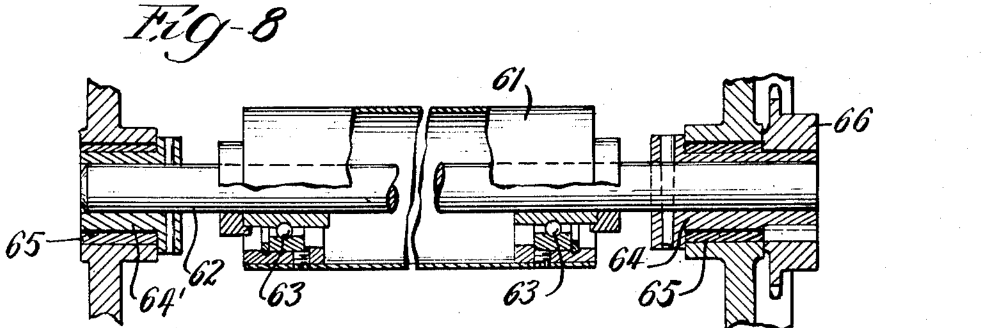
Fig. 8 is a section taken on the line 8—8 of Fig. 7.
Figure 9:
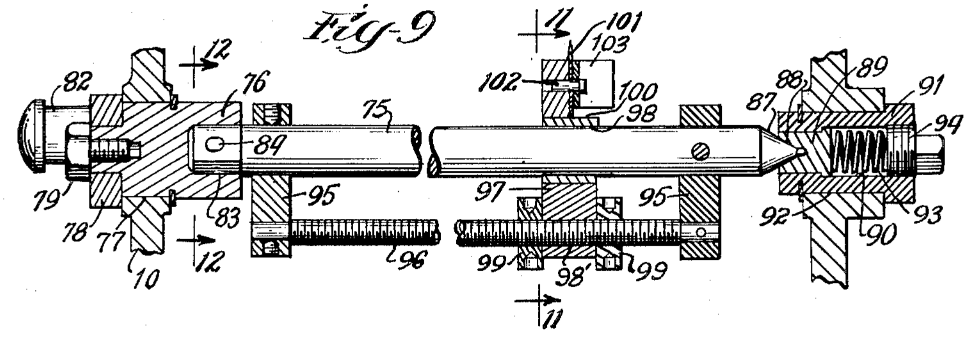
Fig. 9 is a section taken on the line 9—9 of Fig. 7.
Figure 12:
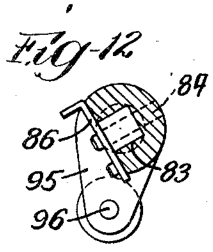
Fig. 12 is a section taken on the line 12—12 of Fig. 9.
Figure 11:
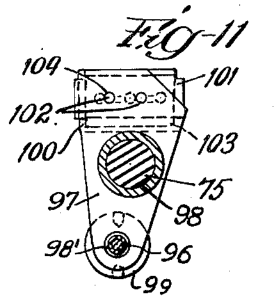
Fig. 11 is a section taken on the line 11—11 of Fig. 9.
Figures 10, 13, 14:
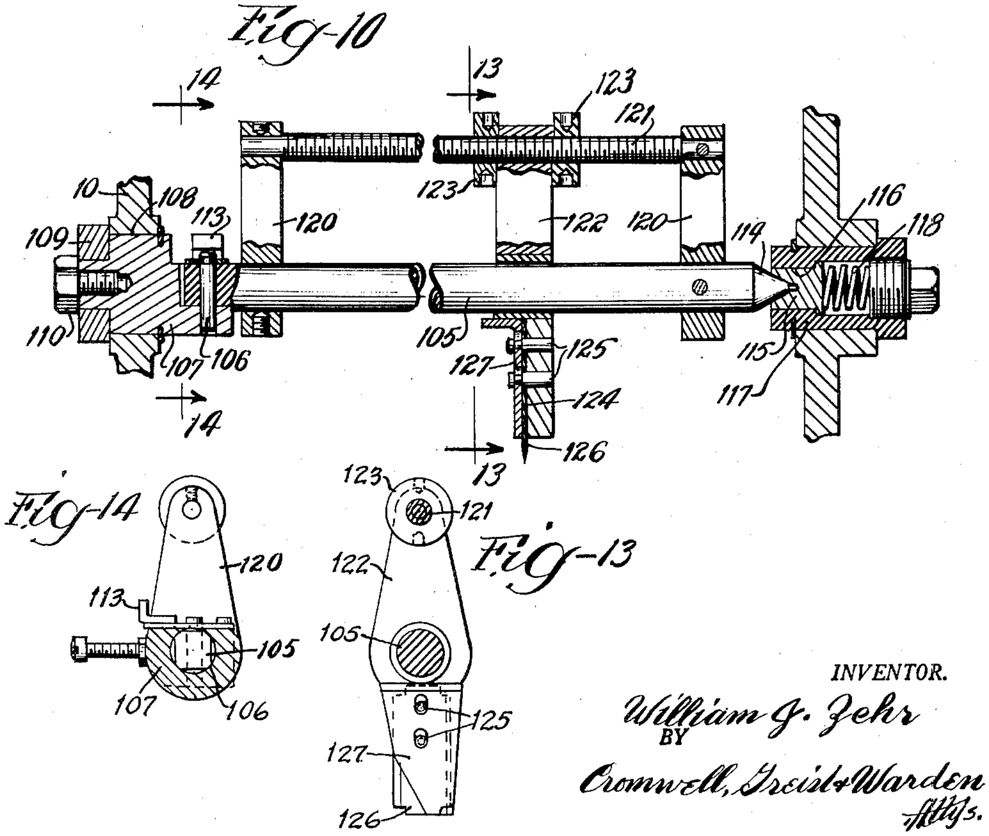
Fig. 10 is a section taken on the line 10—10 of Fig. 7.
Fig. 13 is a section taken on the line 13—13 of Fig. 10.
Fig. 14 is a section taken on the line 14—14 of Fig. 10.

The slitting arrangement comprises upper and lower knife carrying frames (Figs. 7, 9 and 10). The lower frame comprises a cross shaft 75 (Fig. 9) which is secured at one end to a mounting member 76. The mounting member 76 is rotatably supported in an aperture 77 in the side frame plate 10 and is provided at its outer end with an arm 78 which is secured to the end of the member 76 by a cap screw 79. The arm 78 carries at its other end a spring pressed pin 80 which is adapted to be received in one of a pair of spaced apertures 81 in the frame plate 10, the pin 80 being controlled by a knob or handle 82 permitting its withdrawal from or insertion in either one of the apertures 81. The end of shaft 75 is received in a socket 83 (Figs. 9 and 12) in the inner end of the mounting block 76 and is retained therein by a pin 84 which extends through the socket 83 and through the end of the shaft 75, and is held therein by a sliding spring member 86 which permits the pin 84 to be removed and the end of the shaft 75 to be withdrawn out of the socket 83. The rotation of the mounting block 76 by means of the arm 78 permits the shaft 75 to be rotatably adjusted to bring the slitting knives thereon into either operative or inoperative position. At its other end the shaft 75 is pointed at 87 and seated in an axially extending socket or recess 88 in a mounting member or pin bearer 89 which is in turn received in sliding relation in an axially extending recess 90 in a mounting block 91 which is positioned in an aperture 92 in the side plate 11. The pin bearer 89 is headed and the headed outer end engages a compression spring 93 which is held in an enlarged outer portion of the recess 90 by a screw threaded plug 94. With this arrangement the shaft 75 may be released from the mounting block 76, by axial movement against the pressure of spring 93, and readily withdrawn from its mounted position. The shaft 75 carries intermediate its ends a pair of mounting brackets or arms 95 which extend radially and which provide a support for a threaded rod 96. The rod 96 extends between the outer ends of the arms 95 and carries the desired number of slitting knife carriers which consist of a bracket member 97 (Fig. 11) apertured at 98 to receive the shaft 75 in sliding relation and also apertured at 98' to receive the threaded rod 96, the position of the bracket 97 on the shaft 75 being fixed by the nuts 99 secured on the rod 96 on opposite sides of the bracket 97. At its other end the bracket 97 is recessed at 100 to receive thereon a blade or cutting knife 101 which is in the form of a conventional double-edged razor blade. The blade 101 is mounted on a pair of pins 102 and a sliding latch plate 103 is provided having cooperating key-hole slots 104 therein for securing the blade 101 in position. Any number of the blade carriers 97 may be mounted on the shaft 75 and adjusted by means of the nuts 99 on threaded rod 96 to position the blade 101 at the proper location for slitting the web as desired.

The upper knife carrying frame is similar to the lower knife carrying frame and comprises a cross shaft 105 (Fig. 10) which is connected at one end by the pin 106 with the mounting block 107, the latter being rotatably secured in an aperture 108 in the side frame plate 10 and being provided at its outer end with an adjusting arm 109 which is secured thereon by the cap screw 110 and which carries at its other end a spring pressed pin 111

(Fig. 7) for engagement in either one of two spaced apertures 112 on the side frame plate to permit the shaft 105 to be adjusted for operative or inoperative position. The pin 106 is retained in the apertures provided in shaft 105 and mounting block 107 by means of a spring clip or sliding latch member 113. The shaft 105 is pointed at its other end at 114 and received in a suitable recess in the end bearing block 115 which is slidingly mounted in the recess 116 in a bearing member 117 and backed by the spring 118 in a manner similar to the mounting for the shaft 75. The shaft 105 is provided with a pair of radial arms 120 between the outer ends of which there is mounted a threaded rod 121. A plurality of knife carrier brackets 122 are provided which are apertured to receive the shaft 105 and the adjusting rod or screw 121 with each bracket 122 being retained in position by the nuts 123 on the rod 121. The carrier bracket 122 is recessed at 124 and provided with a pair of pins 125 which receive a cutting or slitting blade 126 and a blade retaining spring latch plate 127. The two knife bearing frames are arranged so that operation of the machine need not be interrupted while a dull set of slitting blades or knives is removed and replaced by a fresh set. The shafts 75 and 105 are arranged to be adjusted or rotated as described to place the slitting knives in engagement with the web as it leaves the gyrating roll 61 or to position them out of the path of the web 20 for removal or replacement.

Figure 15:
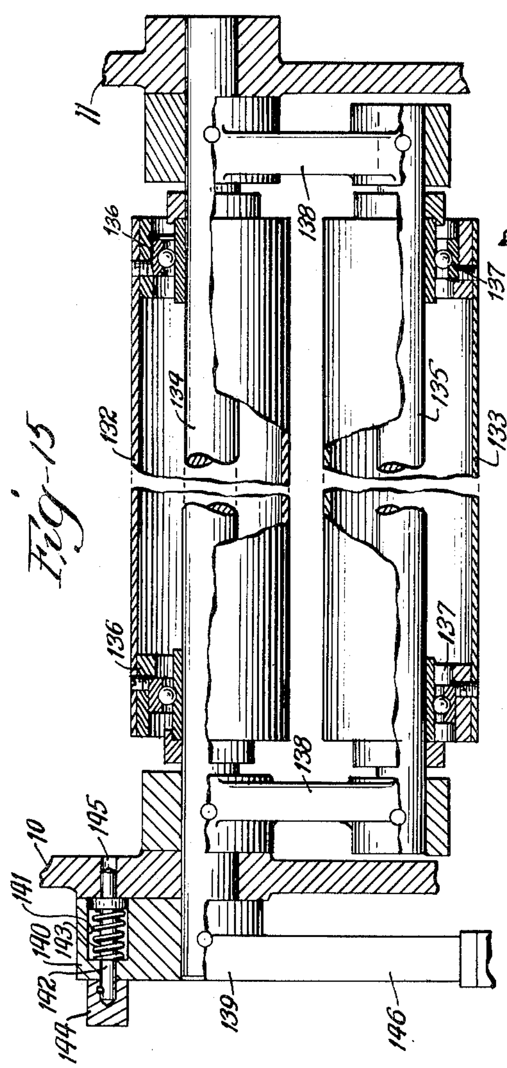
Fig. 15 is a section taken on the line 15—15 of Fig. 7.

The web 20 passes from the slitting or dividing mechanism to guide rollers which direct the same to the rewind spools. The guide rollers are arranged in pairs which are so mounted that the direction of travel of the web can be varied depending on the position of the receiving spools and the direction in which it is desired to wind the web on the latter. The upper pair of guide rollers 130 and 131 and the lower pair of guide rollers 132 and 133 (Figs. 7 and 15) are mounted between the frame plates 10 and 11 in the same manner. The mounting for the lower pair 132 and 133, only, will be described.

The rollers 132 and 133 are mounted on independent shafts 134 and 135, respectively, for independent rotative movement thereon by means of pairs of bearings 136 and 137 arranged at the ends of the rollers. The shaft 134 which carries the roller 132 extends between the side frame plates 10 and 11 and is provided at opposite ends with a pair of support arms 138 in the outer free ends of which the shaft 135 is secured, which carries the roller 133. The shaft 134 is journaled in the frame plates 10 and 11 and projects at one end beyond the plate 10 to receive an adjusting arm 139 which is pinned to the end of the shaft. The arm 139 is provided at one end 140 with a recess 141 for receiving a latch pin 142 and a spring 143 urging the latch pin in the direction of the plate 10. The pin 142 is provided with a control knob or handle 144 secured to the outer end thereof and is adapted to be positioned in either one of the two spaced apertures 145 provided in the frame plate 10 so as to position the two rolls 132 and 133 in two different locations for guiding the web 20 in order that it may be properly fed to the wind-up spool or roll. The other end of the adjusting arm 139 is extended at 146 to provide a handle for rotatably adjusting shaft 134.

Figure 2:
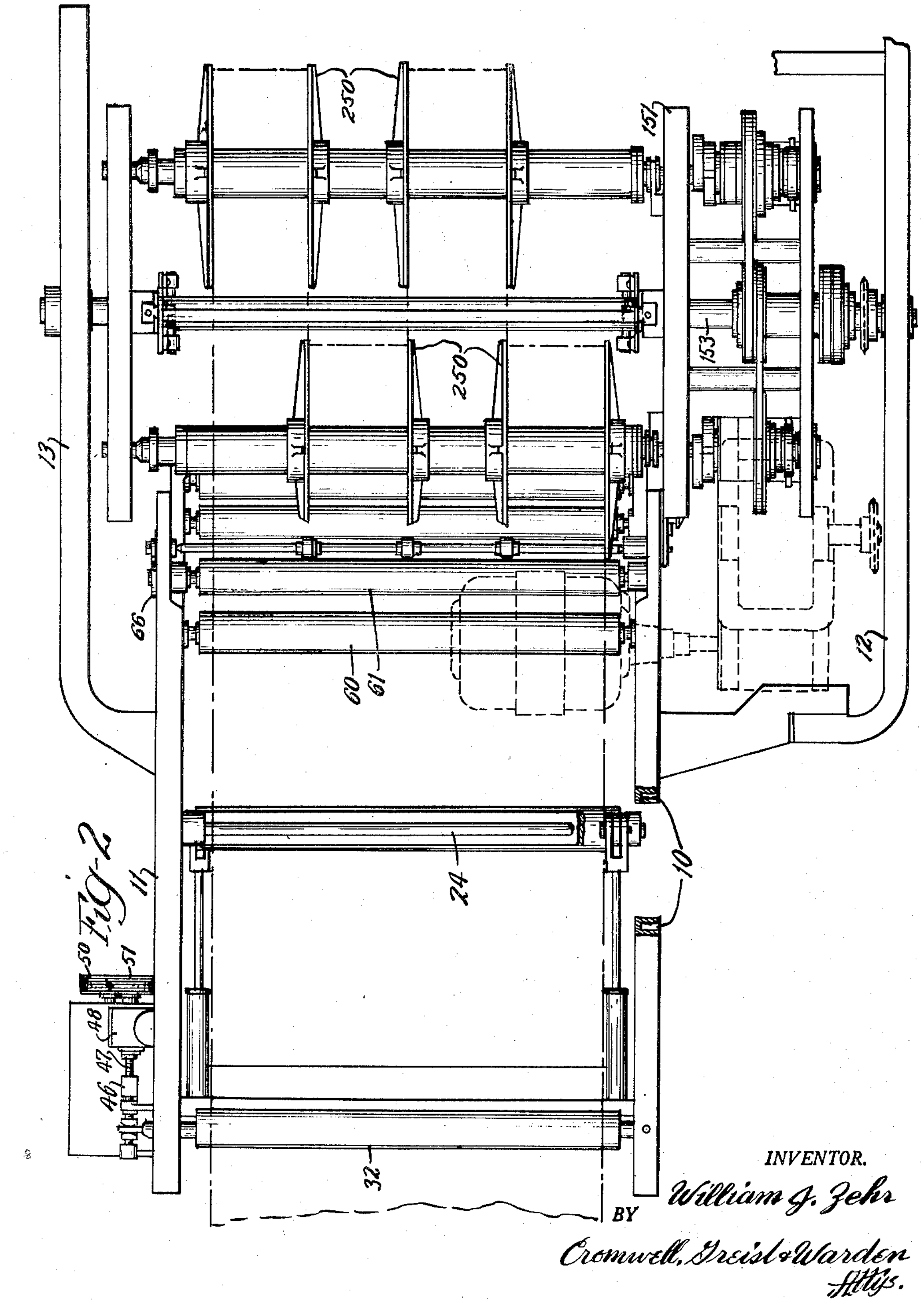
Fig. 2 is a plan view of the mechanism with portions thereof broken away.

The wind-up rolls or spools for receiving the web 20 are supported in frames 150 and 151 which are pivotally mounted on the side plates 12 and 13 of the main supporting frame (Fig. 1). The frame members 150 and 151 are carried on pivot shafts 152 and 153 which are journaled in the side frame plates 12 and 13.

Figure 4:
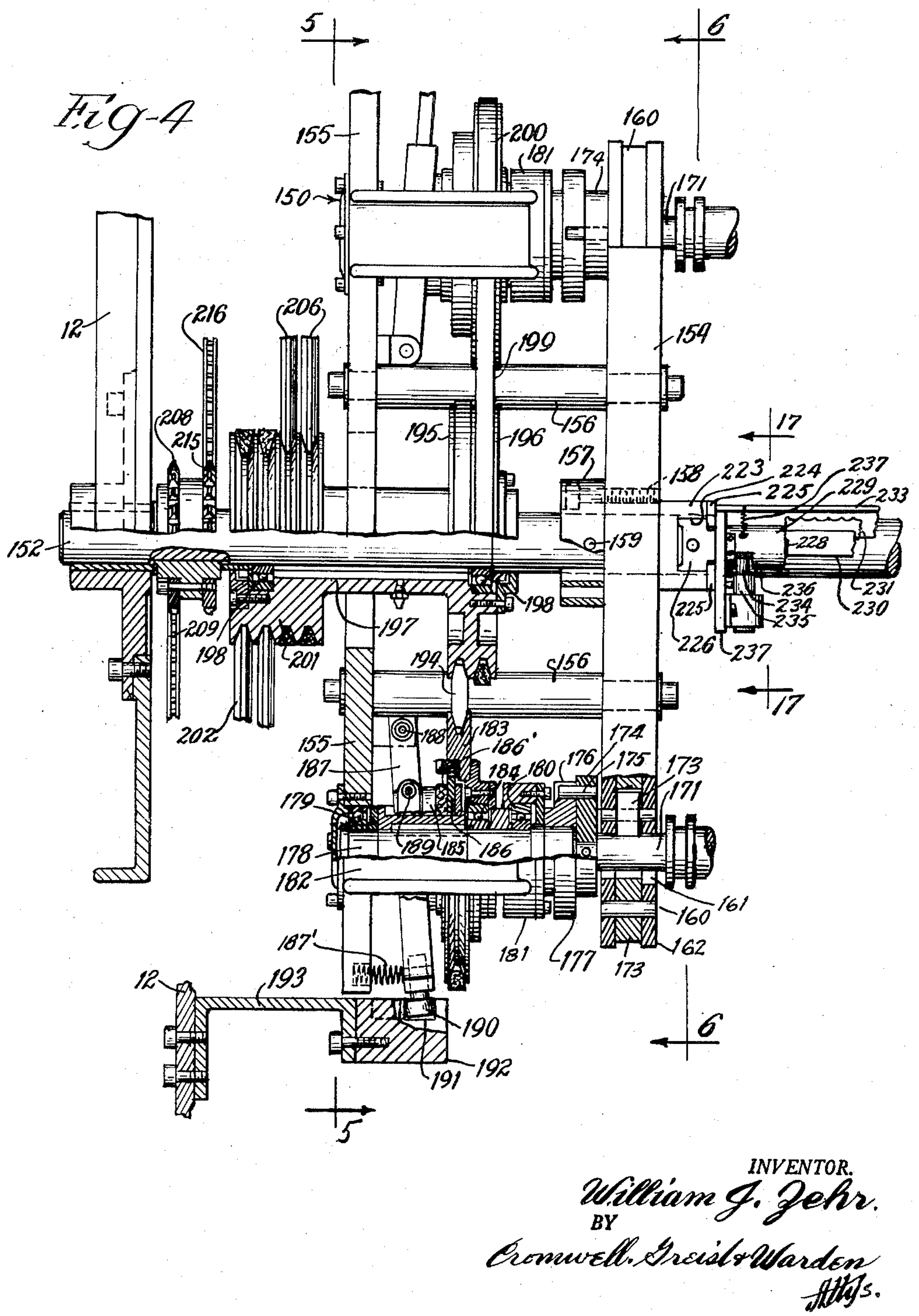
Fig. 4 is a partial section taken on the line 4—4 of Fig. 1, to an enlarged scale.
Figure 5:
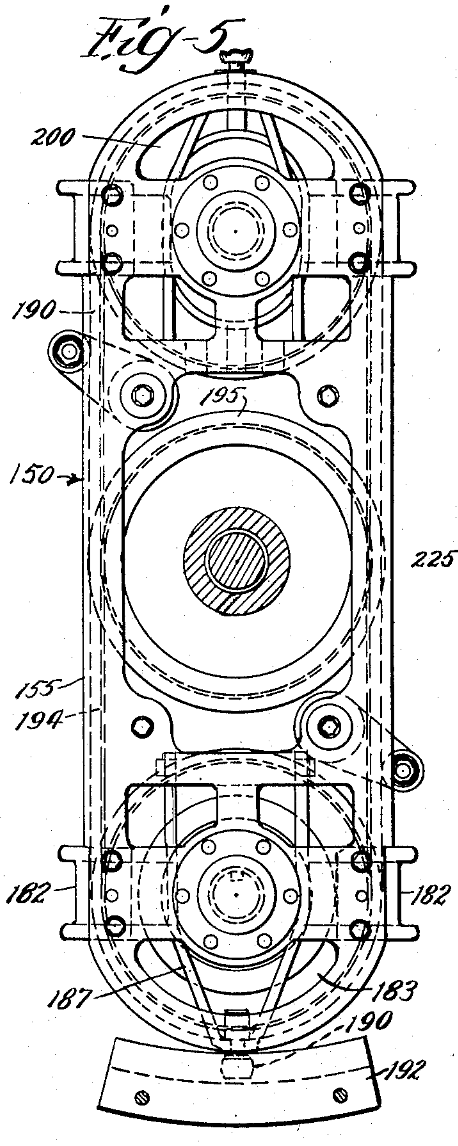
Fig. 5 is a section taken on the line 5—5 of Fig. 4.
Figure 6:
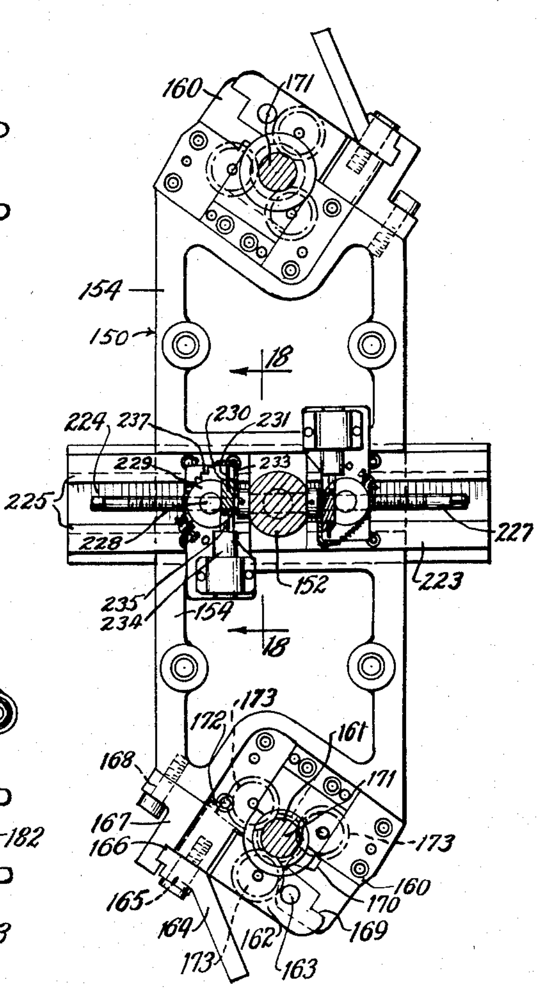
Fig. 6 is a section taken on the line 6—6 of Fig. 4.
Figure 17:
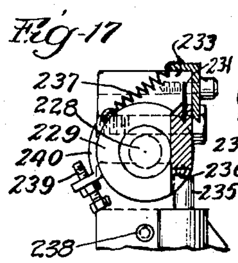
Fig. 17 is a detail section, taken on line 17—17 of Fig. 4, to an enlarged scale.
Figure 18:
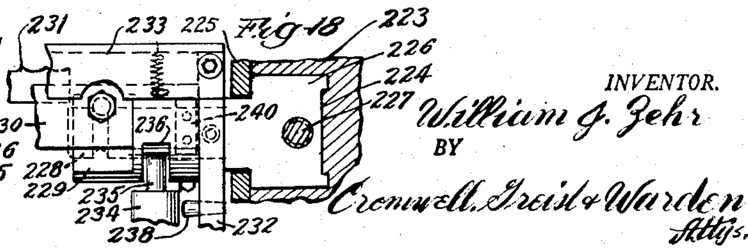
Fig. 18 is a detail section, taken on line 18—18 of Fig. 6, to an enlarged scale.

The driving end of the carrying frame mechanism 150 for the lower pair of wind-up spools is illustrated in Figs. 4–6. The frame mechanism 150 at that end comprises an inner frame plate 154 and an outer frame plate member 155 which are joined together in spaced relation on the pivot shaft 152 by the tie bolts 156, adjacent the inside of side frame plate 12.

The inner plate 154 is secured to the pivot shaft 152 by a block or collar 157 which is fastened to the plate 154 by a bolt 158 and pinned to the shaft 152 by the pin 159. The plate member 154 is generally rectangular with bearing formations 160 at opposite ends which are identical and which receive the ends of the shafts carrying the wind-up spools. The bearing formations 160 provide an outwardly opening bearing recess 161 which is closed in the locked up position by a side plate closure member 162 pivotally mounted at 163 and provided on its free end with a latch element 164 pivoted thereto at 165 and engageable in a latching recess 166 in a latch plate 167 secured by the bolt 168 to the plate 154 adjacent the bearing recess 161. The side wall member 162 is adapted to pivot about the pivot member 163 and cooperating abutment formations 169 and 170 are provided on the plate 162 and the frame plate 154 to limit the movement of the plate 162 so that it provides a support for the roll shaft 171 as the latter is removed from the bearing recess 161. A cooperating stop or holding lug 172 may be provided on the inner face of member 162 to limit the movement of the roll shaft 171 and facilitate its removal from the bearing. A plurality of small rollers 173 may be provided around the recess 161 for insuring free running operation of the shaft 171 when it is rotated.

The shaft 171 is provided on the end thereof with a driving arm or dog 174 (Fig. 4) which carries at its outer end a pin 175 receivable in a slot 176 in the face plate 177 of the spool driving mechanism. The face plate 177 is keyed to a relatively short shaft member 178 which is mounted at one end in the bearing 179 in the outer plate 155 and at the other end, by means of bearings 180, in a support 181 which is connected by yoke extension members 182 to the outer frame plate 155, the members 182 extending in spaced relation therefrom. A drive pulley 183 is rotatably mounted, by means of the bearing 184, on the shaft 178 and a clutch mechanism is provided for clutching the pulley to the shaft 178 to drive the same. The clutch mechanism comprises an axially slidable clutch sleeve 185 on the shaft 178 which carries a drive member 186 engageable with a cooperating member 186′ on the pulley 183. An operating arm or yoke 187 for the clutch is pivotally secured at 188 to the frame plate 155 and connected by the pivot 189 to the clutch sleeve 185. At the free end the operating arm 187 is provided with a cam roller 190 which is engageable in the cam track 191 of a declutching cam 192 which is secured by the brackets 193 to the outer frame plate 12. In the position shown in Fig. 4 the clutch member 186 is in engagement with the cooperating clutch member 186′ on the pulley 183 for driving the shaft 178 and thereby rotating or driving the wind-up spool shaft 171 upon rotation of pulley 183. The cam roller 190 is shown at the entrance to the cam track 191. A compression spring 187′ mounted between the arm 187 and frame member 155 urges the clutch normally into engaged position.

The pulley 183 is connected by a belt 194 with one of a pair of drive pulley formations 195 and 196 mounted on a sleeve 197 which is rotatably mounted by means of spaced end bearings 198 on the pivot shaft 152. The other one of the pulley formations 196 is connected by a belt 199 with a pulley 200 on a drive mechanism for the opposite wind-up spool which is arranged at the other end of the frame plate 154 and which is identical in construction with the mechanism just described.

Figure 3:
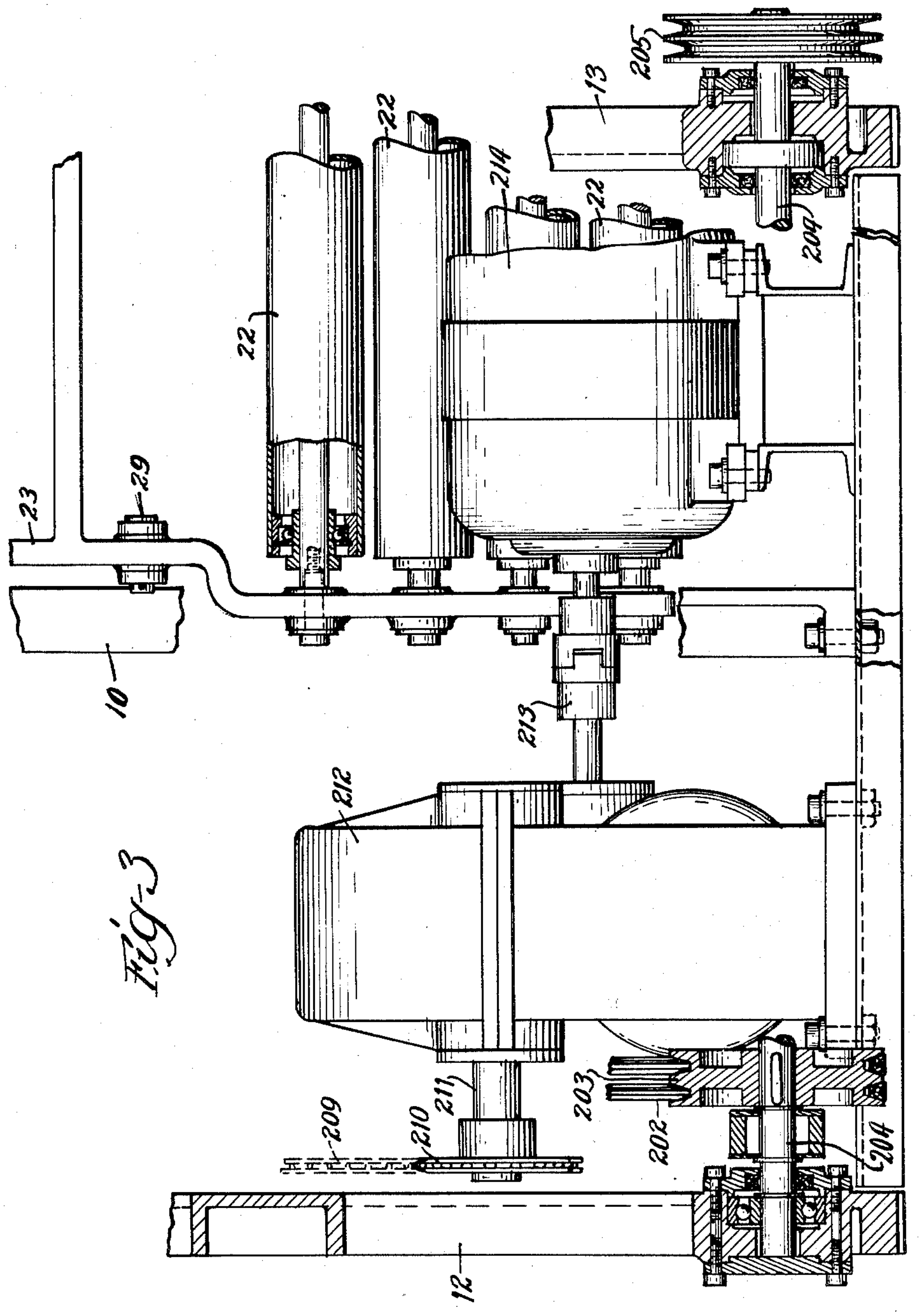
Fig. 3 is a partial section taken on the line 3—3 of Fig. 1, to an enlarged scale.

The sleeve 197 carries at its outer end between the frame plate 155 and the side frame member 12 a compound pulley 201 having one pair of pulley formations connected by belts 202 to a compound pulley 203 (Fig. 3) which is mounted on a main drive shaft 204 journaled in the side frame members 12 and 13 and which carries at one end a power drive pulley 205. The other pair of pulley formations of the compound pulley 201 are connected by belts 206 with a compound drive pulley 207

(Fig. 1) mounted on the driving end of the pivot shaft 153 for the upper frame members which carry the upper spools.

The spool shafts 171 are supported at the other side of the machine by a frame plate (not shown) which is of the same structure as frame plate 154 and which is pinned to the pivot shaft 152 adjacent the side frame member 11, bearing formations of the same construction as 160 being provided to receive the ends of the shafts 171.

The pivot shaft 152 is indexed or rotated to interchange the position of the wind-up spools thereon by means of a sprocket 208 which is connected by a chain 209 with a driven sprocket 210 (Fig. 3) on the output shaft 211 of a speed reducer 212, the input shaft of the latter being connected by the coupling 213 with a suitable drive motor 214, both being mounted at the base of the machine. The lower pivot shaft 152 is connected in driving relation with the upper pivot shaft 153 by means of the sprocket 215 on the shaft 152, drive chain 216 and sprocket 217 (Fig. 1) on the shaft 153. A chain tension idler 218 is mounted on a supporting arm 219 which is pivoted at 220 to the side frame plate 12 and belt tension idler 221 is mounted on a supporting arm 222 which is also pivoted at 220 to the side frame plate 12 to provide the proper tension in both the chain and belt drive.

A knife holding or supporting arrangement for transversely extending knife blades, which may be operated to sever the web when the frame 150 is indexed to start a new roll, is provided on the frame plate 154 at the driving end and the corresponding frame plate at the opposite end of pivot shaft 152. Each knife support comprises an end supporting block or plate 223 (Figs. 4, 6, 17 and 18) which is mounted on the inner face of the frame plate 154 and which extends transversely of the frame pivot shaft 152. Each plate 223 is provided with a recess 224 and cooperating gibs 225 on the inner face thereof forming a guideway. A sliding knife assembly block 226 is supported in the guideway formed by recess 224 and gibs 225 on each side of shaft 152. Each of the blocks 226 is adjustably mounted in the guideway by means of a threaded adjusting bolt 227 which extends through the shaft 152 but which is free to rotate about its own axis to move the blocks 226 relative to shaft 152. Each slide block 226 has mounted thereon a stud 228 adapted to be received in an aperture in a holder member 229 which is secured to the end of an elongate plate forming a knife support member 230 and which is adapted to pivot on the stud 228. The knife blade 231 is secured along one edge of the knife support plate 230. The slide block 226 also carries a generally rectangular end support plate 232 on which one end of an angle member 233 is supported. The angle member 233 which forms a safety guard for the knife blade 231, extends transversely of the machine in parallel relation to the pivot shaft 152 and is secured at its ends to end support plates 232. The guard 233 is positioned so that when the knife holder 230 is pivoted about the studs 228 to bring the blade 231 to non-cutting position, a portion of the face of the knife holder 230 rests against the safety guard member 233. The knife holder 230 is operated or rotated by means of an air plunger mechanism at the option of the operator of the machine to move the blade 231 away from the guard member 233 and into position for the cutting of the web along a transverse line as the frame carrying the winding spools is rotated through 180° to interchange the position of the winding spools. The air motor 234 is mounted on the end support plate 232 with its reciprocating plunger 235 engaging in a recess 236 in the end holder member 229. The plunger 235 moves on a line tangential to the center of rotation of the holder member 229 and rotates the same sufficient to move the knife blade 231 away from guard member 233 and into outwardly projecting operative position where it will engage the web when the carrying frame 150 is rotated about the pivot shaft 152. A tension spring 237 connected at one end to the guard member 233 and at the other end to the knife holder member 229 urges the knife holder in the clockwise direction about the pivot 228 to bring the knife blade 231 against the guard member 233.

A stop pin 238 is provided on the end plate 232 which is adapted to be engaged by the head of a stop bolt 239 which is adjustably mounted in a bracket 240 secured on the end support member 229 and which limits the rotative movement of the knife holder 230 to approximately 20°. The angle at which the knife is positioned relative to the web may, of course, be varied depending upon the nature of the material of the web, it being adjusted so that in the operative position the knife edge will be most effective in severing the web. For most material it is positioned so that it tends to dig into the web sufficiently to start the cut and to overcome the tendency of the web to slide over the knife edge due to the high speed at which the web is usually traveling. An air motor 234 may, of course, be provided at one or both ends of the blade holder 230, and suitable means is provided for controlling the operation of the motor at the will of the operator.

In operation the web is threaded over the rolls 21, 22, 30, 32, 60, 61, 130, 131, 132 and 133 and between the slitting frames. One of the slitting frames is adjusted or swung to the cutting position with the slitting knives adjusted along the frame to cut the web on the proper longitudinal lines. The guide rolls 130, 131 and 132, 133 are adjusted as required depending upon the direction in which the slit sections of the web are wound on the receiving spools 250, the spools 250 being adjusted on the shafts 171 to position them in proper alignment with the slitting knives for receiving the web sections. The web sections may, of course, be wound on the receiving spools in a clockwise or counterclockwise direction depending upon which side of the web is to be located on the outside, that is, the printed side or the unprinted side. The frames 150 and 151 are indexed initially to place the spool carrying shafts 171 at one end or side in proximity to the guide rolls 130, 131 and 132, 133 and the web sections are threaded onto the spools 250 in the proper manner for the direction in which they are to be wound. The drive for the shafts 171 which are adjacent the guide rolls 131, 133 is placed in operation and synchronized with the speed of the press or delivery of the web 20 to the mechanism. The slack take-up mechanism automatically takes up the slack in the web and maintains the desired tension by adjusting the position of the core of a reactor which regulates the current to the rewind drive motor. The web guiding mechanism automatically adjusts the web to keep it in proper alignment for the slitting operation. The rewind spool support frames 150 and 151 are maintained in the position in which they are initially set until the spool or spools are full when they are indexed or rotated by the operator through 180° to move the empty spools 250 which have been positioned on the shafts 171 into winding position and simultaneously move the full spools 250 into the take off position. The transverse severing knives 231 are held in retracted position until just prior to indexing of the frames 150 and 151 when they are moved to cutting position so that as the frames 150 and 151 turn the knives 231 engage the traveling web sections and sever the same. The empty spools which move into position for receiving the web sections are provided on their shafts with an adhesive surface which is brought into engagement with the web sections before they are severed which tends to pull the web against the cut off knife and causes the freed ends of the same to be picked up and wound on the new rolls 250. As the full rolls move to the take off position by rotation of frames 150 and 151 the declutching rollers 190 are received in the cam tracks 191 and the drives for the shafts 171 are disconnected by movement of the clutch operating arms 187. The shafts 171 may then be removed from the bearing formations 160 by rotating latch 164 and swinging the closure member 162 about the pivot 163. The stop members 172 prevent the shafts from falling out of the bearings 160 and permits them to be lifted therefrom and subsequently replaced with empty spools 250 mounted thereon.

The initiation of rotation or indexing of the frames 150 and 151 and the movement of the transverse cutting knives 231 are separately controlled by the operator through suitable electrical control devices. All other controls operative on the web are automatic.

The mechanism has been shown for slitting and rewinding a web but it may be used, if desired, without the slitting mechanism for rapid rewinding operations. The slitting knife frames may be moved out of cutting position and the web wound on single spools placed on the shafts 171.

While specific details of construction have been shown in the illustrated form of the mechanism it will be understood that variations and modifications of the structure may be resorted to within the spirit of the invention.

I claim:

1. In a web handling mechanism, a main support frame, means for advancing a web along said main support frame, transverse shafts mounted on said main support frame, secondary frames rotatably mounted on each of said transverse shafts, reel supporting shafts mounted on said secondary frames in circumferential spaced relation, whereby said reel supporting shafts may be selectively positioned for receiving the web by rotation of said secondary frames, transversely extending support bars rotatably mounted on said secondary frames adjacent the axis of rotation thereof, transverse knives mounted on said bars, guard members extending along said bars and means for rotating said support bars toward and from said guard members whereby to position the knives for engaging the cutting edges thereof with the web to transversely sever the web upon predetermined rotation of said secondary frames.

2. In a winding apparatus having web tensioning and guiding means, a supporting structure comprising vertical side plates positioned along the path of travel of the web, a frame mounted for rotation about an axis extending between said supporting side plates, said frame having end plates adjacent said side plates, reel supporting means mounted for rotation on axes extending in spaced parallel relation between said end plates, power means connected to said frame and said reel supporting means for rotating said frame relative to said supporting structure and for rotating said reel supporting means relative to said frame, control means whereby said frame may be rotated by said power means about its axis to interchangeably position the reel supporting means thereon between non-rotating and rotating position for receiving the web on reels positioned thereon, transverse web severing means movably mounted on said supporting frame adjacent the axis of rotation thereof, and means operable upon said reel supporting means being interchanged and while said reel supporting means are rotating for moving said web severing means into position for automatically severing the web transversely whereby to permit removal of a full reel while a new roll is begun on another reel spaced therefrom.

3. In a web winding apparatus, transversely spaced vertical side frame supports, means for guiding the web in a path between said side frame supports, spaced reel supporting frames rotatably mounted on said side frame supports, spaced reel supports on each of said supporting frames, said reel supports being positioned on opposite sides of the axis of rotation of said supporting frames, power means for rotating said supporting frames to interchangeably position said reel supports thereon for receiving the web, said reel supports being located in a position to receive the web in one position of said supporting frame and being located in a non-web receiving position in another position of said supporting frame, power means operative to rotate said reel supports in any position of said supporting frames, and transverse severing means mounted on said supporting frames adjacent the axis of rotation of said supporting frames and engageable automatically with the web for transversely severing the same upon rotation of said supporting frames to interchange the reel supports and move the reels from web receiving to non-web receiving position.

4. In a web winding apparatus, transversely spaced vertical side frame supports, means for guiding the web in a path between said side frame supports, vertically spaced reel supporting frames rotatably mounted on said side frame supports, reel supports on each of said supporting frames, said reel supports being positioned on opposite sides of the axis of rotation of each of said supporting frames, power means connected to said supporting frames and to said reel supports to rotate said supporting frames relative to said side frame supports and said reel supports relative to said supporting frames, transverse web severing means movably mounted on each of said supporting frames adjacent the axis of rotation of said supporting frames, and means for moving said web severing means into and out of operative position, whereby when said supporting frames are rotated to interchangeably position the reel supports thereon, said web severing means is moved into operative position to engage and automatically sever said web.

5. In a web winding apparatus, transversely spaced vertically extending side frame supports, means for guiding the web in a path between said side frame supports, cooperating vertically spaced pairs of reel supporting frames rotatably mounted on said side frame supports, spaced reel supporting shafts on each pair of supporting frames, said reel shafts being spaced on opposite sides of the axis of rotation of said reel supporting frames, power means for rotating said reel supporting frames to interchangeably position the reel shafts thereon for receiving the web, means connecting said power means to said reel shafts to rotate said reel shafts, transverse web severing means movably mounted on said reel supporting frames adjacent the axis of rotation thereof, and means for moving said web severing means from a non-operative position into a generally radially extending operative position to engage the web and transversely sever the same upon rotation of said supporting frames to interchange said reel shafts.

6. In a web handling mechanism, a main support frame, means for advancing the web along said main support frame, transverse shafts mounted on said main support frame, secondary frames rotatably mounted on said transverse shafts, reel supporting shafts mounted on said secondary frames in circumferential spaced relation, power means connected to said secondary frames and said reel supporting shafts for rotating said secondary frames relative to said main support frame and said reel supporting shafts relative to said secondary frames, whereby said reel supporting shafts may be selectively positioned for receiving the web by rotation of said secondary frames, transversely extending knife bars rotatably mounted on adjustable end supports on said secondary frames adjacent the axis of rotation thereof and between each reel supporting shaft and the next adjacent reel supporting shaft, and means for rotating said end supports to shift said bars into operative position for transversely severing the webs upon predetermined rotation of said secondary frames.

7. In a web handling mechanism, a main support frame, means for advancing a web along said main support frame, vertically spaced transverse shafts journaled on said main support frame, secondary frames mounted on each of said transverse shafts, reel supporting shafts mounted on said secondary frames in circumferential spaced relation, power means connected to the transverse shafts supporting said secondary frames for rotating said secondary frames to selectively position said reel supporting shafts for receiving the web on reels supported thereon, and power means connected to said reel supporting shafts for rotating said reel supporting shafts, said last mentioned power means comprising a driven member rotatably mounted on each transverse shaft, driving members for the reel supporting shafts connected in driving relation with said driven member, a clutch connecting each of the driving members and the reel supporting shafts and having an operating cam arm extending therefrom, and a fixed cam mounted on said support frame outboard of the path of rotation of the secondary frames in a position to engage the clutch cam arms and actuate the clutch therefor when a reel supporting shaft is moved out of web receiving position thereby to disconnect the drive therefrom without interrupting any of the other drives.

8. In a roll winding apparatus, a supporting structure including spaced side frame members, web guiding and tensioning means extending between said side frame members, a pair of spaced cross shafts journaled in said side frame members, power means connected to one of said shafts for rotating the same, a driving connection between said shafts for rotating the other of said shafts simultaneously therewith, sub-frames mounted on said shafts for rotation therewith, reel supports rotatably mounted on said sub-frames on opposite sides of the axis of rotation thereof, power drive means for rotating said reel supports comprising a driven member rotatably mounted on one end of each of said cross shafts, and drive means connecting each of said reel supports with the driven member which is rotatably mounted on the cross shaft for its sub-frame, said last mentioned drive means including a clutch having a projecting operating arm, and a cam fixed on said supporting structure at a predetermined position outboard of the path of rotational movement of each of said sub-frames for engaging the respective clutch operating arms whereby each clutch is actuated automatically to disconnect the drive from its associated reel support when the sub-frame on which it is mounted is rotated to move said reel support to a predetermined non-winding position and said oppositely disposed reel support is moved to a winding position.

9. In roll winding apparatus, a supporting structure including spaced side frame members, web guiding and tensioning means extending between said side frame members, a pair of cross shafts journaled in vertically spaced relation in said side frame members, power means connected to one of said shafts for rotating the same, a driving connection between said shafts for rotating the other of said shafts simultaneously therewith, sub-frames mounted on said shafts for rotation therewith, said sub-frames each having side plates and reel supports rotatably mounted between said side plates in oppositely disposed relation and spaced radially relative to the axis of rotation of each said sub-frame, a drive member rotatably mounted on the cross shaft supporting each sub-frame, drive means connecting each of said reel supports with a drive member for rotating said reel supports on the sub-frame, and a power drive connected in driving relation with each said rotatably mounted drive member, said last mentioned drive means including a clutch having an operating arm and a cam fixed at a predetermined position outboard of the path of rotational movement of the associated sub-frame for engaging said clutch operating arm whereby each clutch is actuated to disconnect the drive from its associated reel support when the sub-frame on which it is mounted is rotated to move said reel support to a non-winding position and said oppositely disposed reel support to a winding position.

References Cited in the file of this patent

UNITED STATES PATENTS

| | | |
|---|---|---|
| 208,856 | Schurmann | Oct. 8, 1878 |
| 284,753 | Munro | Sept. 11, 1883 |
| 437,896 | Kaffenberger | Oct. 7, 1890 |
| 929,876 | Pulsifer | Aug. 3, 1909 |
| 953,742 | Eigner | Apr. 5, 1910 |
| 1,356,271 | Dozier et al. | Oct. 19, 1920 |
| 1,976,641 | Vernon et al. | Oct. 9, 1934 |
| 2,171,741 | Cohn et al. | Sept. 8, 1939 |
| 2,200,000 | Johnstone | May 7, 1940 |
| 2,435,369 | Simonds | Feb. 3, 1948 |
| 2,606,614 | Piper et al. | Aug. 12, 1952 |